United States Patent Office 2,844,588
Patented July 22, 1958

2,844,588

ISONICOTINYL HYDRAZONES OF CERTAIN FORMYL PHENOXY ACETIC ACIDS

Charles O. Siebenmann and Alfonsas Zubrys, Toronto, Ontario, Canada, assignors to Minister of National Health and Welfare, representing Her Majesty the Queen, in right of Canada No Drawing. Application January 9, 1956
Serial No. 557,846

2 Claims. (Cl. 260—295)

This invention relates to processes and products for chemotherapy of tuberculosis.

During the last decade many advances have been made in the treatment of tuberculosis. These advances have been due, in part at least, to the introduction of chemotherapy into the care of tuberculous patients. Among the preparations which have been used with notable success are streptomycin, dihydrostreptomycin, p-amino-salicylic acid, and isonicotinic acid hydrazide (isoniazid) or combinations of some of these agents. Though these preparations have remarkable properties for the treatment of tuberculosis, they have not been without some disadvantages. Thus there has been concern for toxic action upon the patient by the long-continued use of some of the drugs. In some instances, objections have been raised concerning the injurious effect which some of the above-mentioned preparations may have upon the nervous system as evidenced by neurotoxic symptoms observed in patients and in experimental animals.

It is therefore the object of this invention to provide improved antituberculous preparations of reduced toxicity.

Another important object is to devise a process for producing effective antituberculous preparations of low toxicity in a simple and economical manner.

Still another object is to devise a process as aforesaid which will enable the antituberculous preparations to be produced in quantity.

In our work in this field we have discovered that certain hydrazones can be produced which exhibit marked antituberculous activity and yet have a very low toxicity and are therefore particularly suitable for human administration.

More specifically, we have discovered that certain hydrazones can be prepared from members of the class of acids consisting of ortho- and meta-aldehydo-phenoxy-aliphatic acids which hydrazones exhibit marked antituberculous activity, and show very low toxicity. In particular, these hydrazones are isonicotinyl hydrazones prepared from the above-mentioned class of acids.

While according to the invention isonicotinyl hydrazones may be prepared from the broad class of acids within the ortho- and meta-aldehydo-phenoxy-aliphatic acids referred to above (that is, acids where the aldehydo group is attached in a position other than the para position), use of the short chain aldehyo-phenoxy-acetic acids either unsubstituted or with an alkyloxy substituent in the benzene ring have been found particularly convenient for the preparation of our hydrazones.

Therefore, for purposes of illustrating our invention the following detailed description deals particularly with the preparation of our hydrazones from the short chain aldehyo-phenoxy-acetic acids.

In the practice of our invention we couple the acids of the class defined with the grouping

by replacing the oxygen of the aldehyde (or formyl) group —CHO— with this new group. Thus is formed the isonicotinyl hydrazone of the particular member of the class of aldehydo-phenoxy-aliphatic acid selected.

It is to be understood that where reference is made herein to aldehydo-phenoxy-aliphatic acids, or more specifically, to aldehydo-phenoxyacetic acids, these terms are intended to include both the unsubstituted acids such as 2-aldehydo-phenoxyacetic acid and alkyloxy substituted acids such as 6-methoxy-2-aldehydo-phenoxyacetic acid.

Thus, for instance, in producing the hydrazones of 2-formyl-phenoxyacetic acid

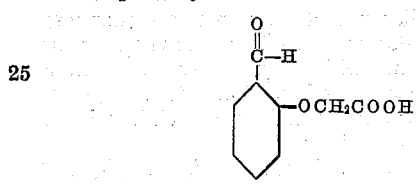

the coupling of the grouping

results in the production of isonicotinylhydrazone of 2-formyl-phenoxyacetic acid

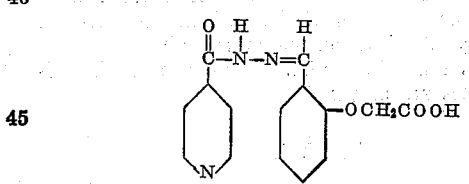

In the practice of our invention, we have also produced as a starting acid for our hydrazones a new acid comprising 6-methoxy-2-formyl-phenoxyacetic acid.

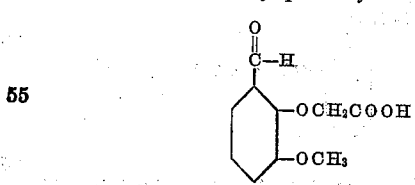

The isonicotinyl hydrazone produced from this new acid has been found to be of particular merit, as it combines marked effectiveness in tuberculous infection with a very low degree of toxicity as demonstrated in tests described below.

Since the production of our new antituberculous compounds involves new processes resulting in the coupling together for the first time of certain starting materials, which in certain instances are in themselves new, and since these processes must be capable of producing the antituberculous preparations or drugs in pure form and in economical quantities, we have carefully investigated the requirements necessary in the steps of producing our new hydrazones.

In general, our new process is as follows:

A solution of isonicotinic acid hydrazide is first prepared in pure water or in some aqueous medium such as an aqueous alcoholic solution. This is then mixed with a solution of the chosen aldehydo-phenoxy-aliphatic acid. After the solutions have been mixed for a short time, the mixture is stored for several hours during which time the hydrazone precipitates. To facilitate the reaction, hot solutions may be used, and the mixed solutions may be heated for a few minutes under a reflux condenser. To facilitate precipitation of the compounds the mixture may be stored in a refrigerator for several hours. No special significance is attached to the concentration of the reactants which are used though it will be obvious to those skilled in the art that, for economic reasons, the proportions are approximately equi-molecular. A suitable concentration has been found to be of the order of from about 1 mole to about 2 moles per litre. After the desired product has formed, it is removed from the mother-liquor by known means such as decanting, filtering, or centrifuging. The precipitated material is then washed with liquids in which the product is relatively insoluble but which will remove impurities contained in the mother-liquor. For such washing liquids a solution of composition similar to that of the mother-liquor may be used, such as water or water-alcohol solution, or the product may be washed with a series of solvents such as water, alcohol, ketone and ether. The washed material is then dried, on some occasions in vacuo, either with or without the application of heat.

The finished preparation is checked for identity and purity by known procedures, such as melting point, solubility, or other analytical procedures. Following tests on laboratory animals, the preparation is prepared in suitable form such as tablets, capsules, finely divided powder, suspension, etc., for administration to patients.

Our preparations may be administered to patients as the sole chemotherapeutic products which are used, or they may, more commonly, be used in conjunction with other treatments such as treatment with streptomycin or dihydrostreptomycin. The quantity which is administered and the duration of time will be dependent, of course, upon the condition of the patient. However, a dose frequently used is about one gram daily.

By way of specific illustrations of our process the following examples are given:

EXAMPLE I

*Production of isonicotinylhydrazone of 2-formyl-phenoxyacetic acid*

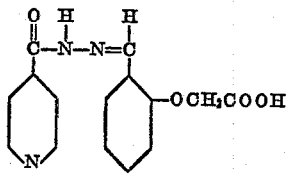

A solution of 13.7 grams (0.1 M.) of isonicotinic acid hydrazine in 100 ml. of water, heated to approximately 60° C., was mixed with a solution of 18 gm. (0.1 M.) of 2-formyl-phenoxyacetic acid in 120 ml. of ethanol (also heated to approximately 60° C.). This was heated on the steam bath, for 15 minutes under reflux, and allowed to stand in the cold-room for 18 hours. The slightly yellowish precipitate which formed was filtered, washed with water, ethanol, acetone, and dried. Yield 29 gm., M. P. 246–248° C. (uncorrected).

EXAMPLE II

*Production of isonicotinylhydrazone of 6-methoxy-2-formyl-phenoxyacetic acid*

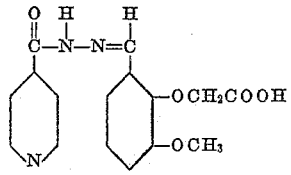

To a solution of 210 gram (1 M.) of 6-methoxy-2-formyl-phenoxyacetic acid in 1500 ml. of ethanol was added a warm solution (about 60° C.) of 137 gram (1 M.) of isonicotinic acid hydrazine in 1000 ml. of water with stirring.

The reaction product was left for three hours at room temperature, filtered, washed with ethanol, dried in air, pulverised and finally dried in a vacuum oven at 60° C. Yield 335 gm., M. P., 230–232° C. (uncorrected).

While the effectiveness of the products produced by our processes can be demonstrated in patients, very clear and convincing proof of the antituberculous properties of our preparations can also be shown in laboratory animals. Mice are animals which are commonly used, and extensive studies have been conducted with these animals showing the effectiveness of our preparations. Mice have also been used to demonstrate the low toxicity of our compounds—a toxicity substantially lower than the toxicity of many preparations at present being used in the treatment of tuburculosis. This lower toxicity is an additional important advantage of our preparations.

In this connection it will be appreciated that the usefulness of any material intended for human administration is dependent in part upon the low toxicity of the preparation. The low toxicity of our compounds has been demonstrated in the usual manner by tests with mice. To groups of mice (10 mice in each group) have been fed, in one dose, graded amounts of the hydrazones disclosed in Examples I and II above, namely isonicotinylhydrazone of 2-formyl-phenoxyacetic acid and isonicotinylhydrazone of 6-methoxy-2-formyl-phenoxyacetic acid. For comparison, similar groups of mice were fed graded doses of another chemotherapeutic substance in widespread use for the treatment of tuberculosis, namely isoniazid. Table I shows the $LD_{50}$ for each of these substances at the end of a period of seven days, where $LD_{50}$ represents a dose lethal for 50 percent of the animals.

TABLE 1.—ACUTE ORAL TOXICITY OF ANTITUBERCULOUS SUBSTANCES TESTED IN MICE

| Compound | Dose, grams per Kg. | Survivors | $LD_{50}$, grams per Kg. |
|---|---|---|---|
| Isonicotinylhydrazone of Example I | 7.5 | 3/10 | 6.5±0.45.[1] |
|  | 6.0 | 6/9 |  |
|  | 5.0 | 8/10 |  |
|  | 4.0 | 9/10 |  |
|  | 3.5 | 10/10 |  |
| Isonicotinylhydrazone of Example II | 5.0 | 10/10 | greater than 10.0. |
|  | 10.0 | 10/10 |  |
| Isoniazid | 0.40 | 1/10 | 0.23±0.015.[1] |
|  | 0.30 | 1/10 |  |
|  | 0.25 | 4/10 |  |
|  | 0.20 | 6/10 |  |
|  | 0.15 | 10/10 |  |

[1] Standard error.

It is evident from Table 1 that the new compounds, fed in single doses, have less than one twenty-fifth the toxicity of isoniazid, a preparation which is presently in wide clinical use. Low toxicity is, of course, of great importance when administration of an agent is contemplated for an extended period.

That these new preparations show in addition to low toxicity a marked effectiveness in experimental tuberculous infection was demonstrated in mice as illustrated by the following tests:

Fifty-seven young female albino mice, weighing between 16 and 20 grams, were divided into 6 groups consisting of 1 group of 7 mice and 5 groups of 10 mice each. All mice were intravenously inoculated with a fine suspension of a bovine strain (Ravenel) of tubercle bacilli grown for 10 days in Dubos' fluid Tween-albumin medium at 37° C. The infective dose was so adjusted that it would kill untreated mice between the 15th and 20th day. A group of 10 infected control mice was given a standard diet consisting of ground fox chow. The 5 groups of infected mice to be treated were first given this same normal diet for 7 days followed by 21 days of medicated diets containing the various drugs to be tested in the concentrations indicated in Table 2. The drugs were incorporated in the ground feed in the form of fine powder.

The 10 untreated control mice all died between the 17th and the 19th day after inoculation as a result of the tuberculous infection whereas in the treated groups death was delayed or prevented.

TABLE 2.—ANTITUBERCULOUS EFFECT OF VARIOUS SUBSTANCES IN MICE [1]

| Number of Infected Mice | Treatment | | Survivors in Percent | | | |
|---|---|---|---|---|---|---|
| | Drug | Percent in Diet | 21st Day | 28th Day | 49th Day | 63rd Day |
| 7 | Isoniazid | 0.02 | 100 | 100 | 100 | 100 |
| 10 | do | 0.01 | 100 | 100 | 90 | 80 |
| 10 | do | 0.005 | 80 | 60 | 40 | 20 |
| 10 | Isonicotinyl-hydrazone of Example I. | 0.02 | 100 | 90 | 90 | 60 |
| 10 | Isonicotinyl-hydrazone of Example II. | 0.02 | 100 | 100 | 100 | 80 |
| 10 | Controls (No treatment). | | 0 | | | |

[1] Treatment was administered from the 7th to the 28th day (21 days).

Table 2 records the survival percentages as observed for the various treated groups until the 63rd day after inoculation, when all surviving mice were sacrificed.

It will be seen from Table 2 that our new compounds have marked antituberculous activity. In the case of the isonicotinyl hydrazone of Example II, it is evident that a diet containing 0.02 percent of this compound has about the same antituberculous effect as a diet containing about 0.01 percent of isoniazid. Though this amount of our compound is about twice that of isoniazid, attention is directed to the fact that the amounts of our compounds which are necessary are much farther removed from the toxic dose than is the case when isoniazid is used.

At autopsy the untreated control mice which succumbed to the infection showed extensive and distinctly marked tuberculous gross lesions in the lung. By contrast, those mice which survived to the 63rd day owing to the treatment with the new hydrazones or with isoniazid showed only slight changes in the lung in the form of barely visible small tuberculous lesions or scars.

A further demonstration of the antituberculous effect of our new substances was obtained in additional tests conducted in the same manner as that which is recorded in Table 2 with the hydrazones of Examples I and II above. It will be noticed from Table 3, that in this test, the two new compounds of Examples I and II above, have given complete, or almost complete, protection against the otherwise fatal tuberculous infection for a period extending over fifty days.

TABLE 3.—ANTITUBERCULOUS EFFECT OF TWO NEW HYDRAZONES IN MICE [1]

| Number of Infected Mice | Treatment | | Survivors in Percent | | |
|---|---|---|---|---|---|
| | Drug | Percent in Diet | 21st Day | 28th Day | 50th Day |
| 10 | Isonicotinylhydrazone of Example I. | 0.02 | 100 | 100 | 100 |
| 10 | Isonicotinylhydrazone of Example II. | 0.02 | 90 | 90 | 80 |
| 10 | Controls (No treatment) | | 0 | | |

[1] Treatment was administered from the 7th to the 28th day (21 days).

A further demonstration of the antituberculous activity of the hydrazones of Examples I and II is recorded in Table 4. These tests were designed to show the effectiveness of our compounds in cases of far advanced experimental tuberculous infection. It will be appreciated, of course, that a drug, in order to be useful in the treatment of tuberculosis must be effective in controlling advanced infections. The method which was employed was similar to that described in the earlier tests or experiments recorded in Table 2, except, of course, that the mice which had been inoculated with a suspension of tubercle bacilli were not treated until the 12th day after inoculation by which time the majority of the animals were in a moribund state. The food which the animals then received contained various amounts of antituberculous materials as recorded in Table 4. These amounts incorporated in the normal diet were used in this experiment in equimolar dosages. This form of chemotherapy was given continuously for three months. The evaluation of the amount of gross tuberculosis, present at the time of sacrifice (105th day), was based on the method described by J. P. Youmans (Ann. N. Y. Acad. Sci. 52:662, 1949).

It will be clear from a consideration of the number of survivors and from the amount of gross tuberculosis recorded at autopsy that our new isonicotinyl hydrozones have marked antituberculous effect, even in instances when the infection appears to be well established. It can also be concluded that mole for mole our preparations compare very favourably with isoniazid, which is, of course, in widespread clinical use.

TABLE 4.—ANTITUBERCULOUS EFFECT OF VARIOUS SUBSTANCES IN FAR-ADVANCED EXPERIMENTAL TUBERCULOSIS IN MICE

| Number of Mice | Treatment | | Amount of Gross Tuberculosis in Lungs [3] | | Survivors on 105th Day |
|---|---|---|---|---|---|
| | Drug | Dosage Percent in Diet | Average | Range | |
| 7 | Isoniazid | 0.020 | 1.1 | 0.5 to 2.5 | 7/10 |
| 9 | Isonicotinyl-hydrazone of Example I. | 0.0437 | 1.3 | 1 to 2 | 8/9 |
| 10 | Isonicotinyl-hydrazone of Example II. | 0.0503 | 1.3 | 1 to 2.5 | 9/10 |
| 7 | Pre-treatment Controls [1]. | | 2.7 | 1.5 to 3.5 | 0/7 |
| 10 | Regular Controls [2] | | 3.5 | 3 to 4 | 0/10 |

[1] Killed on 11–12th day after inoculation.
[2] Nine of the 10 control mice died between the 16th and 19th day, one survived to the 30th day.
[3] Based on evaluation of 0 to 4+ as observed at autopsy of survivors sacrificed on 105th day.

The pre-treatment controls (Table 4) killed shortly before feeding of medicated diets was commenced, show that lesions developed among the animals prior to treatment. Comparison of the extent of gross tuberculosis in the lungs of these pre-treatment controls with the extent of gross tuberculosis in the lungs of the treated animals shows that the medication, effective in prolonging life, was also effective in reducing the extent of lesions.

It is evident that there was, under the critical conditions of this experiment, an exhibition of marked antituberculous activity by all the chemotherapeutic substances which were used, although it was observed that, in all cases, three months' treatment was not sufficient to eradicate completely the far-advanced tuberculous infection since cultures taken from the lungs showed the presence of viable tubercle bacilli in a majority of the surviving treated animals.

Since, particularly where far advanced tuberculous infection is to be treated, it is evident that antituberculous preparations must be administered over extended periods, the importance of having a preparation of low toxicity will be readily appreciated. Thus the present invention, by providing preparations or compounds combining marked antituberculous activity and low toxicity is a significant advance in the art.

While our hydrazones have been extensively tested as antituberculous preparations, there also appears even at this time to be other valuable uses for these chemotherapeutic agents or preparations.

What we claim as our invention is:

1. A new compound selected from the group consisting of—

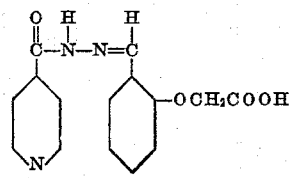

and

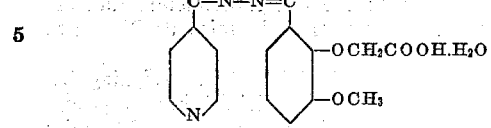

2. A new compound having the formula—

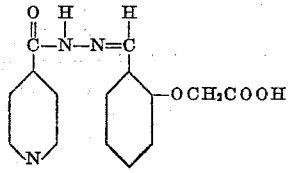

References Cited in the file of this patent

UNITED STATES PATENTS 2,727,041    Girard _____ Dec. 13, 1955

OTHER REFERENCES

Levaditi et al.: Chem. Abs., vol. 47, col. 5542b (1953).
Beilstein: Handbuch der. Org. Chemie, vol. 8, p. 243, 4th ed. (1925).